May 23, 1944.   N. M. HOPKINS   2,349,728
WAR VESSEL WITH HIGH POWER, LONG RANGE GUN
Filed June 27, 1940   10 Sheets-Sheet 1
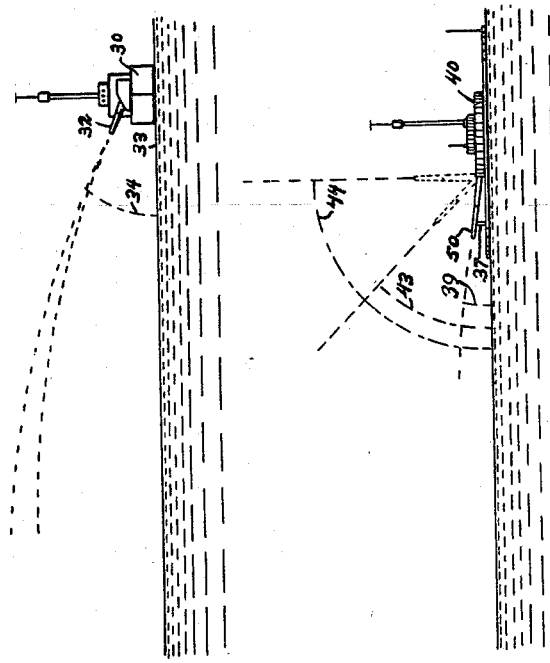
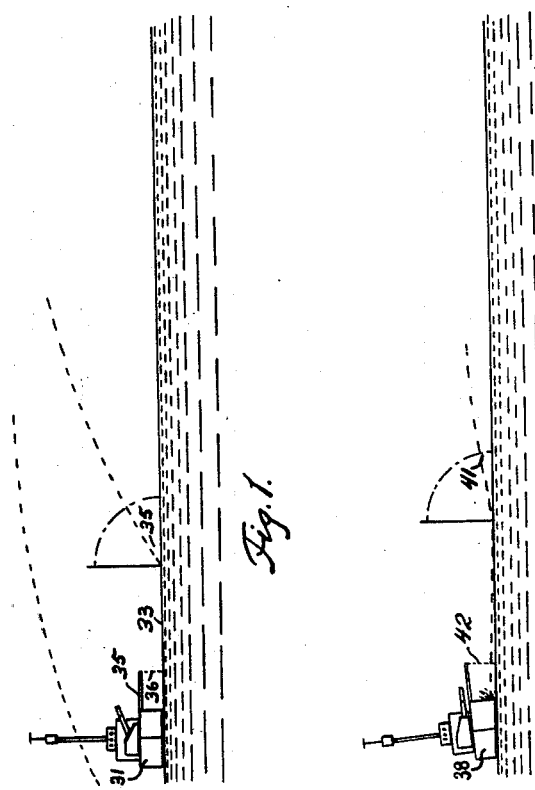
INVENTOR.
N. M. Hopkins
ATTORNEY

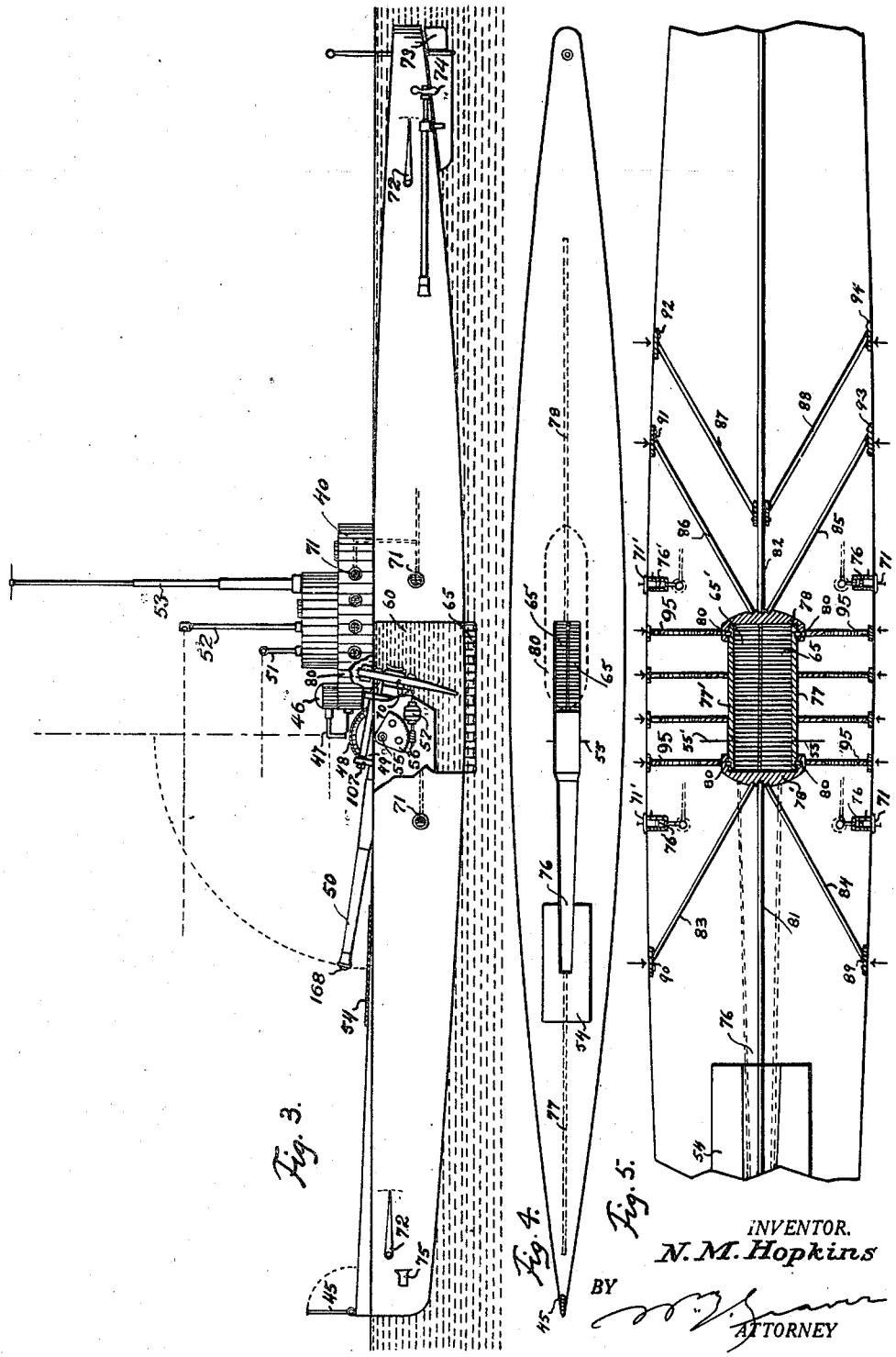

May 23, 1944. N. M. HOPKINS 2,349,728
WAR VESSEL WITH HIGH POWER, LONG RANGE GUN
Filed June 27, 1940 10 Sheets-Sheet 3
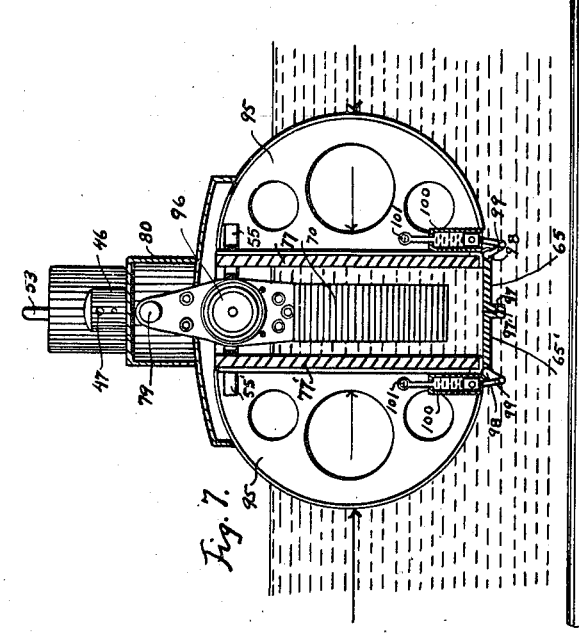
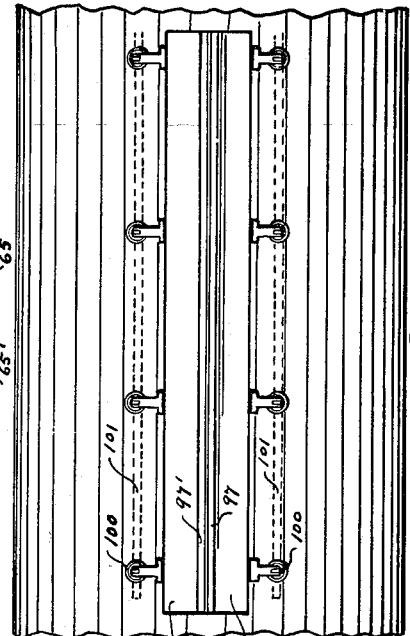
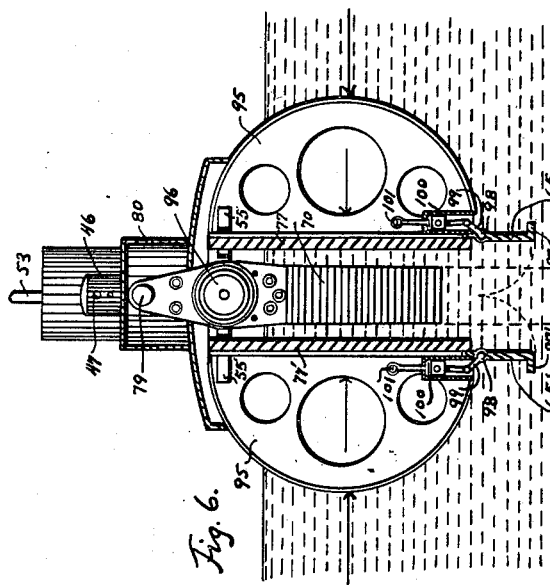
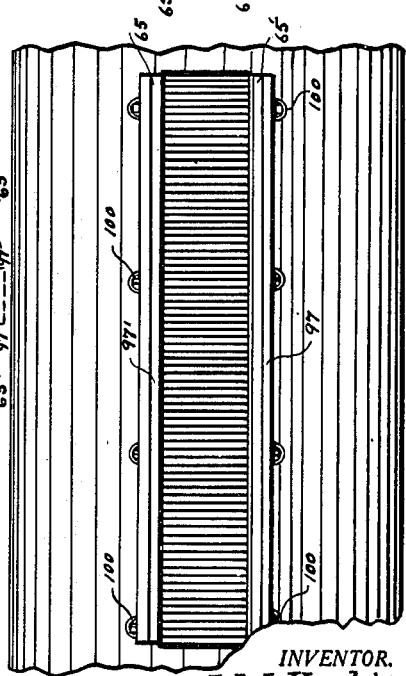
INVENTOR.
*N. M. Hopkins*
BY
*ATTORNEY*

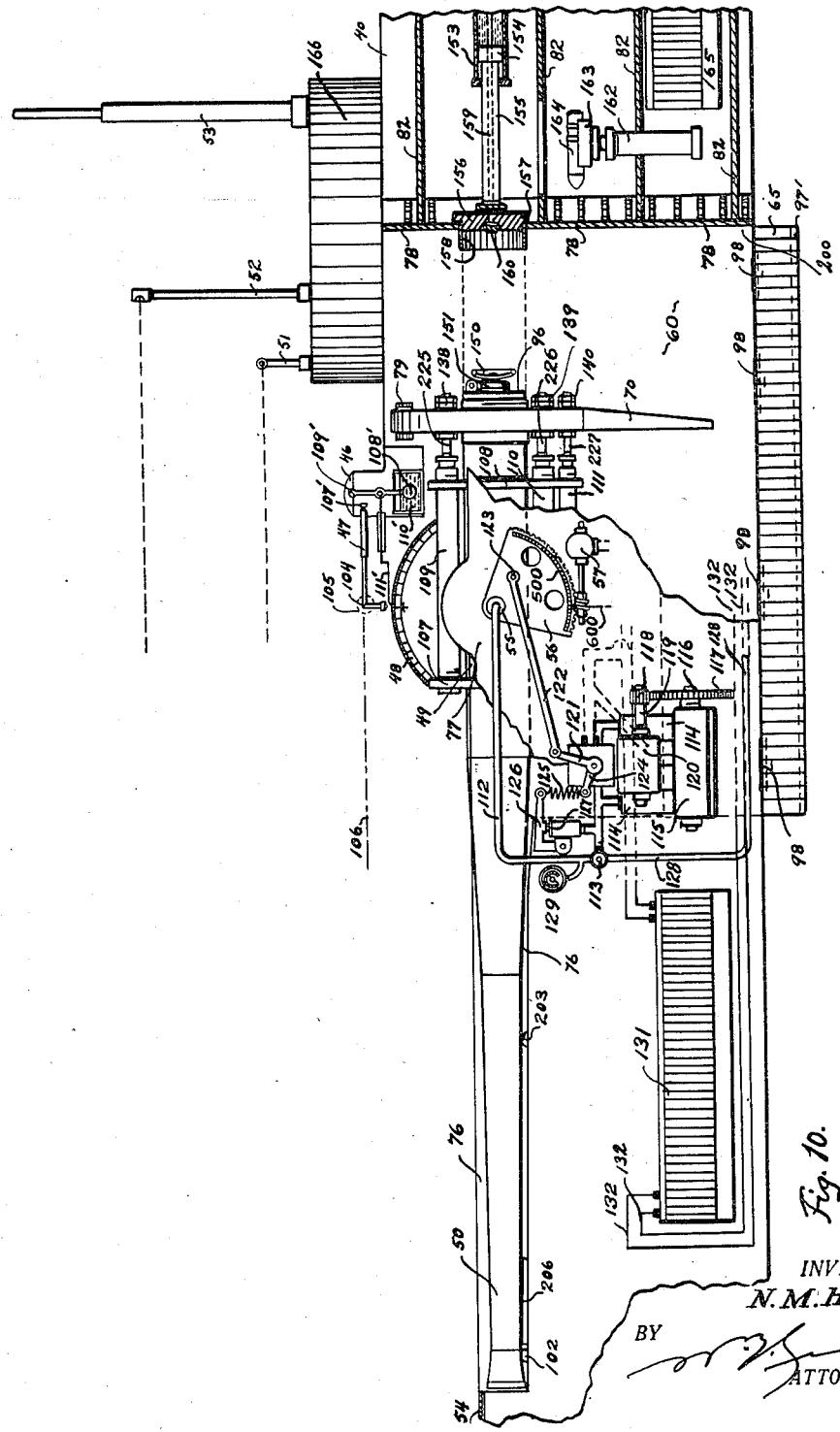

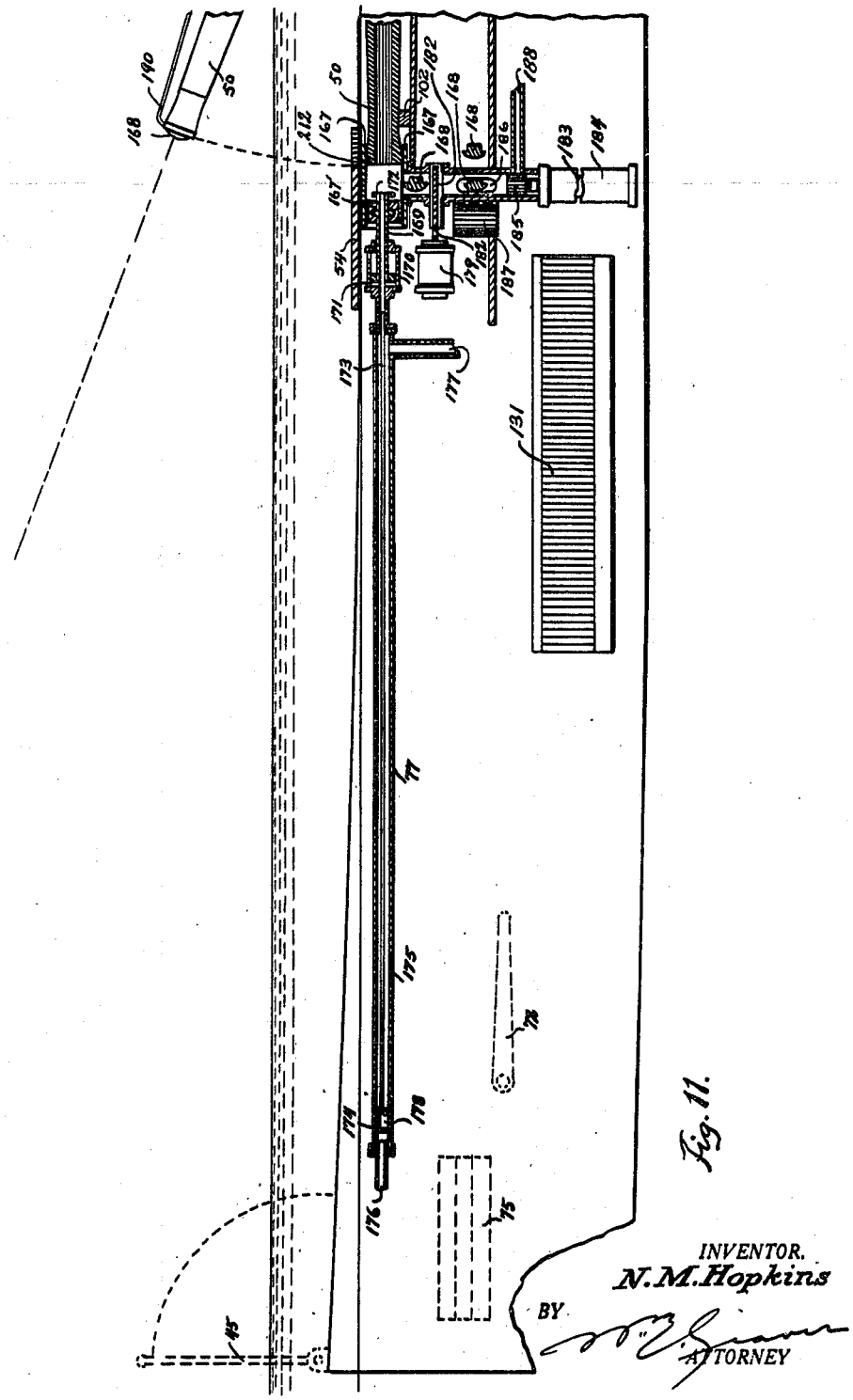

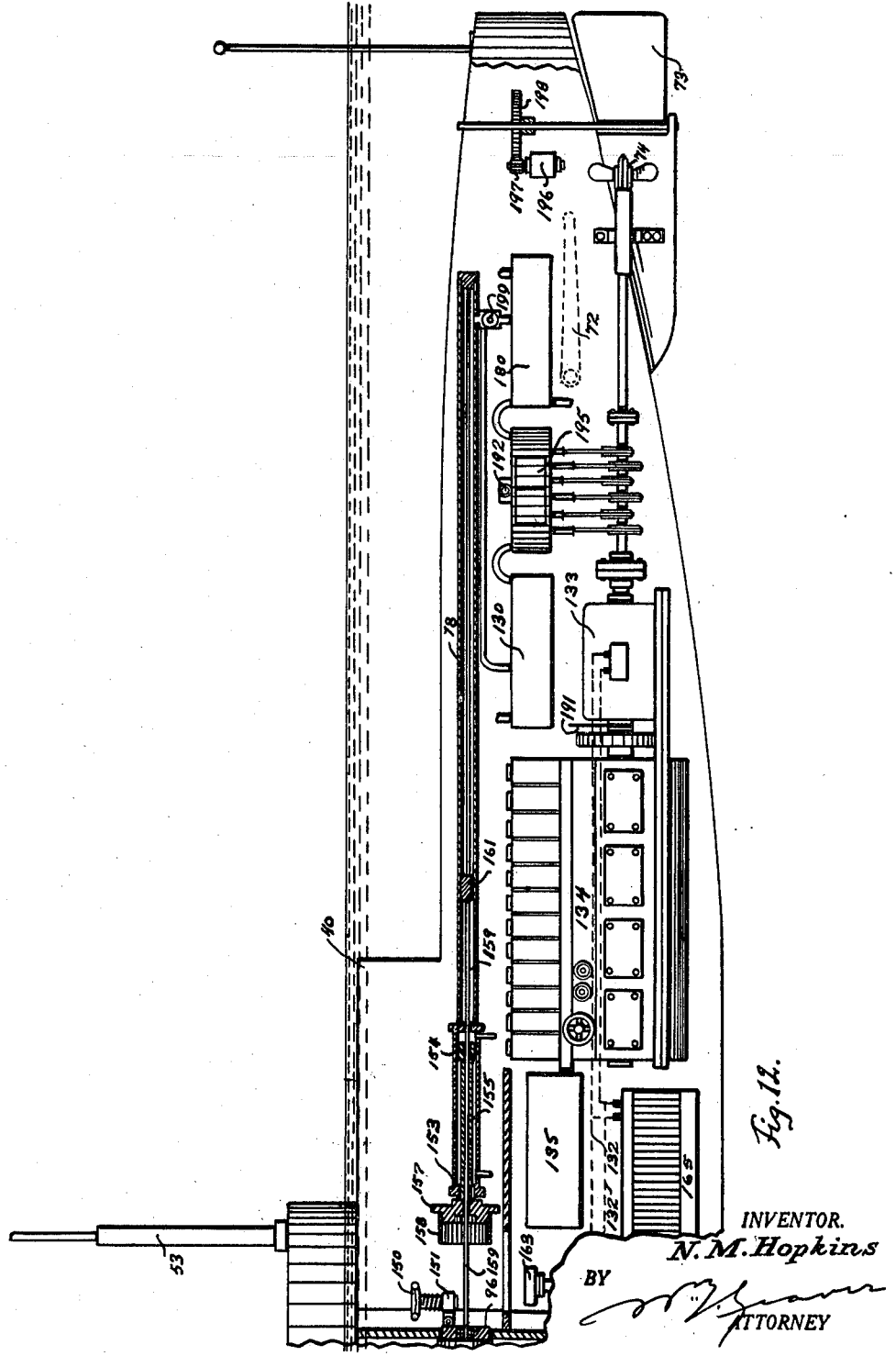

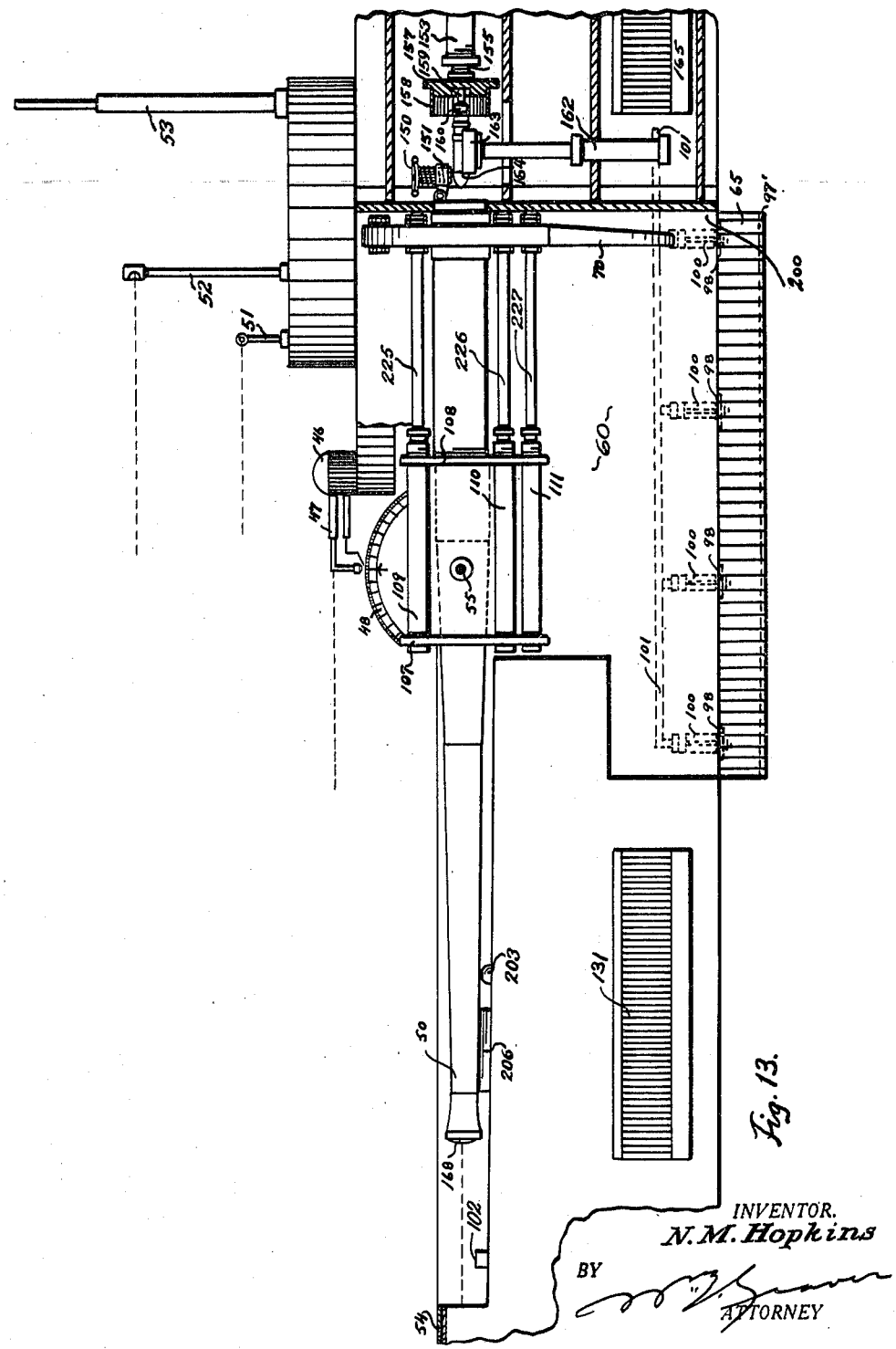

May 23, 1944. N. M. HOPKINS 2,349,728
WAR VESSEL WITH HIGH POWER, LONG RANGE GUN
Filed June 27, 1940 10 Sheets-Sheet 8
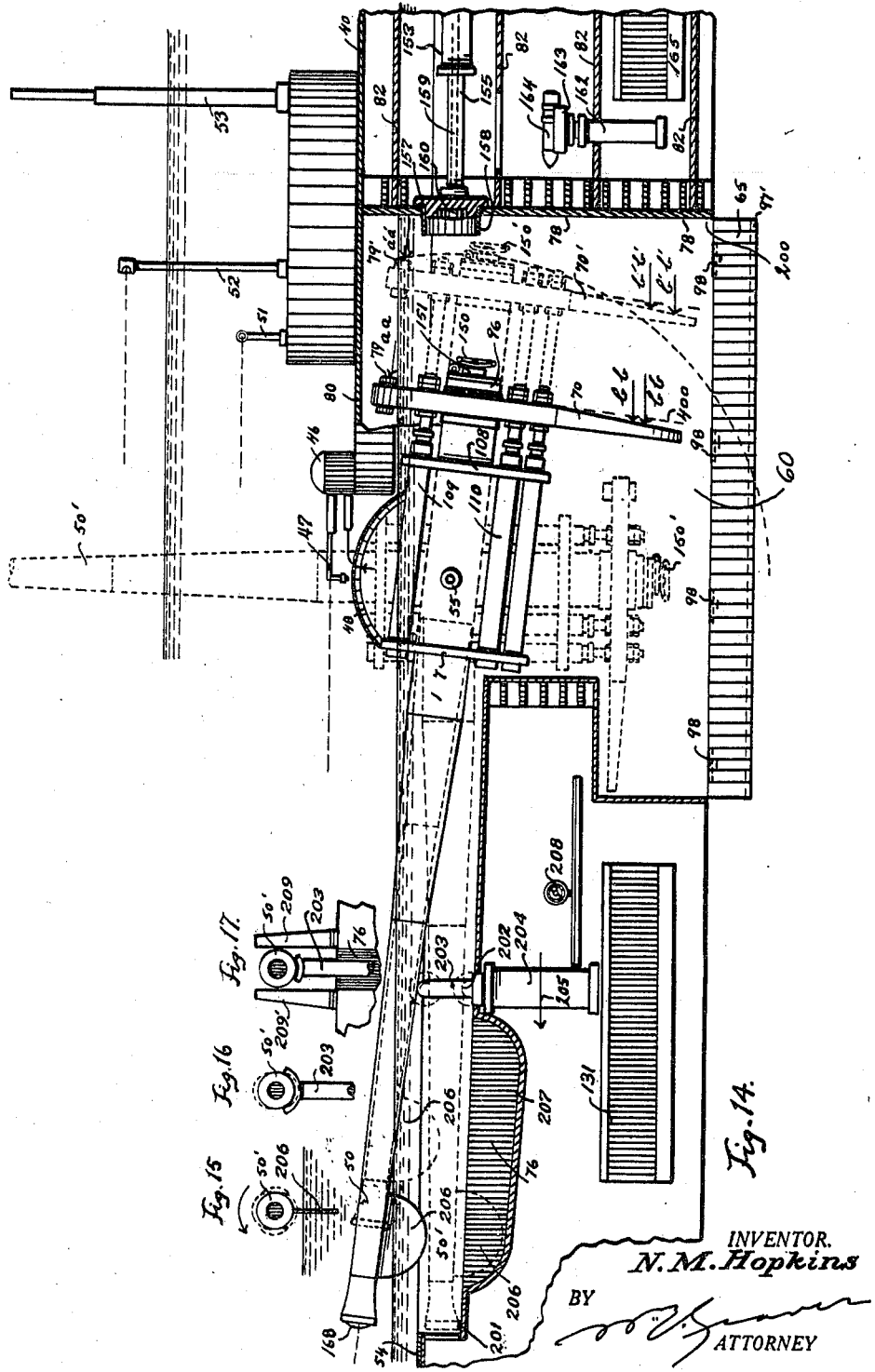
INVENTOR.
N. M. Hopkins
BY
ATTORNEY

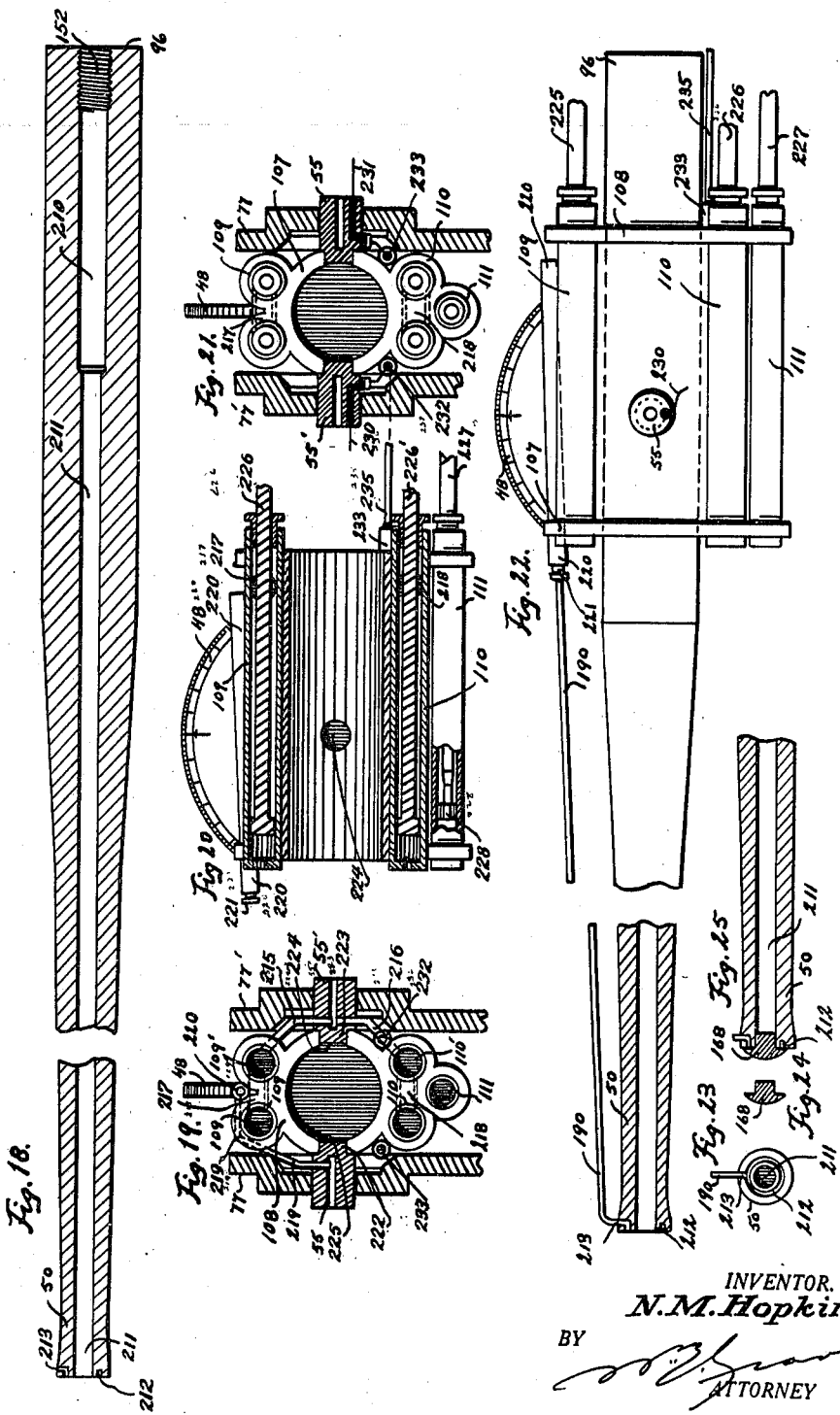

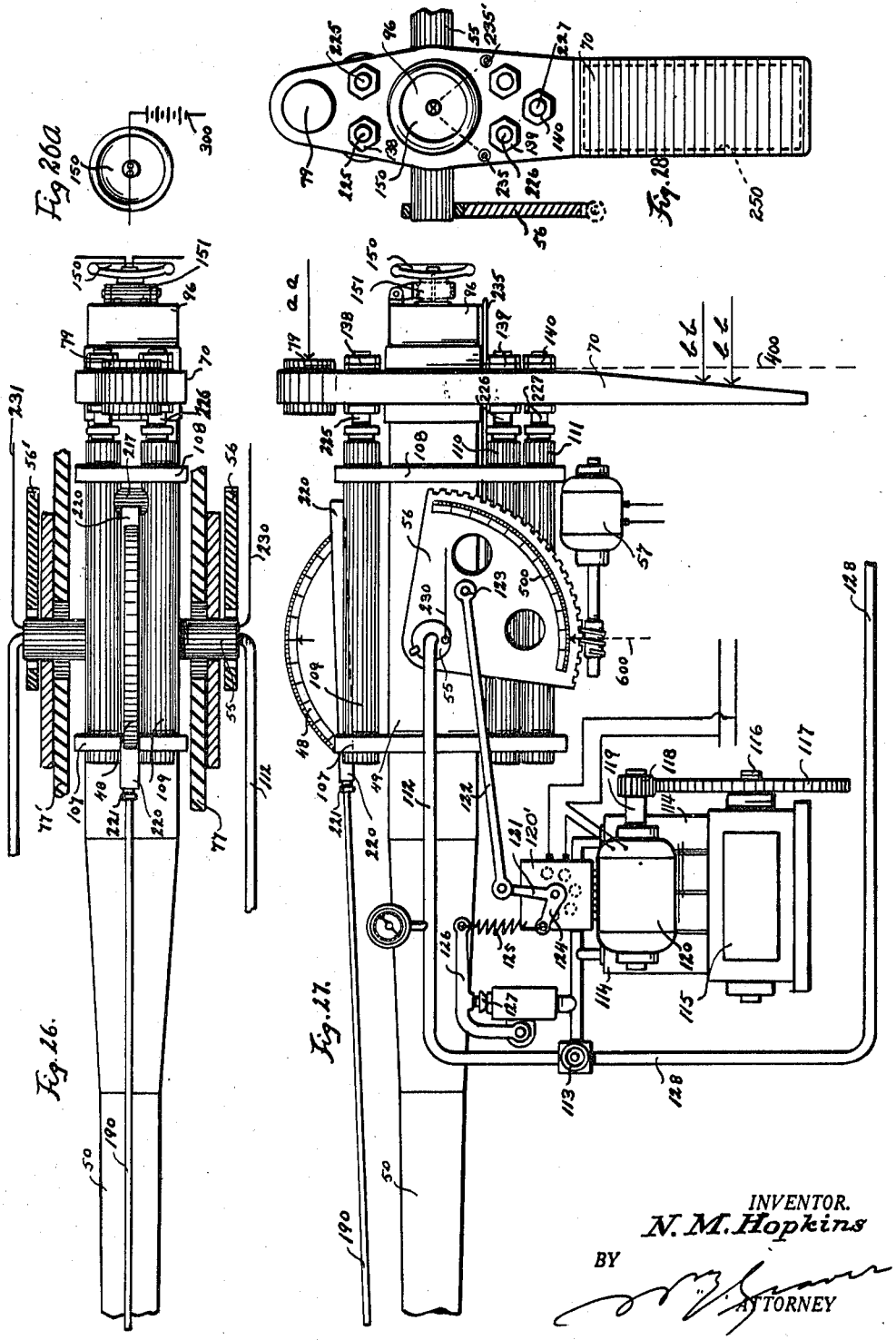

Patented May 23, 1944

2,349,728

UNITED STATES PATENT OFFICE 2,349,728

WAR VESSEL WITH HIGH POWER, LONG RANGE GUN

Nevil Monroe Hopkins, New York, N. Y., assignor to United States Trust Company of New York Application June 27, 1940, Serial No. 342,783

31 Claims. (Cl. 114—1)

This invention relates to guns, and more particularly to guns mounted upon a support floating on or disposed in water, having for its principal object to provide a construction more powerful and more efficient than those heretofore proposed. Consequently, this invention covers the mounting of a gun on a naval vessel which is submersible or otherwise, as well as upon other structures disposed on or in particularly the water of the sea but, in the interests of simplicity of illustration, only one type of such a mounting structure is herein illustrated namely, a submarine or submersible vessel.

Another object of this invention is the provision of such a gun mount that an exceptionally long and hence more powerful gun can be mounted and fired than has been heretofore possible due to the fact that such particular mounting of the gun takes advantage of the well known Archimedes' principle of submerged bodies.

Still another object of this invention is to utilize the water of the sea in the absorption of a large percentage of the recoil of the gun upon firing whereby coincident strains upon the supporting structure are materially reduced.

Another object of the invention lies in the provision of means to overcome the inherent tendency of the gun to droop particularly when the gun is used in low angles of elevation at firing.

Still another object of the invention is the provision of a counterbalance disposed adjacent to the breech end of the gun and cooperating with the normal recoil mechanism of the gun, whereby said counterbalance coacts with the water of the sea to provide an additional hydraulic resistance operative during gun recoil.

Other objects of the invention will appear as the description of the gun and its operation is disclosed hereinafter.

With all objects of the invention in view, the invention resides in the novel details of construction and combinations of parts as will be disclosed hereinafter and particularly pointed out in the claims.

Referring to the accompanying drawings forming a part of this specification and in which like numerals designate like parts in all the views, Fig. 1 represents a conventional battleship firing upon an enemy ship in the conventional manner;

Fig. 2 represents one design of vessel contemplated by this invention, firing upon an enemy vessel at a low angle of gun elevation and hence close to the water-line;

Fig. 3 is a side elevational view of the vessel shown in Fig. 2, with a portion thereof cut away to show the mounting of my gun;

Fig. 4 represents a deck plan view of the vessel shown in Fig. 3 with the superstructure and gun removed;

Fig. 5 is an enlarged top plan view of the midship section of said vessel with the superstructure, gun and deck removed;

Fig. 6 is a midship transverse sectional view in the region of the gun mount and illustrating the auxiliary keel members in open position as when the gun is fired;

Fig. 7 is a view similar to Fig. 6 but showing the auxiliary keel members in closed position;

Fig. 8 is a fragmentary bottom view of the vessel showing the keel members in open position;

Fig. 9 is a view similar to Fig. 8 but showing the keel members in closed position;

Fig. 10 is a midship longitudinal sectional view of the vessel on a large scale showing in detail the gun mount with the gun in stowed position;

Fig. 11 is a longitudinal sectional view of the fore or bow end of the vessel illustrating only the means for evacuating water from the bore of the gun and the means for capping the gun after such evacuation;

Fig. 12 is a longitudinal sectional view of the aft or stern end of the vessel illustrating only the power plant and the means for swabbing the bore of the gun as well as the means for loading the gun;

Fig. 13 is a view somewhat similar to Fig. 10 but illustrating the gun in its rearmost position for loading;

Fig. 14 is a view somewhat similar to Fig. 10 but illustrating the gun loaded and elevated to a position for firing;

Figs. 15, 16 and 17 are somewhat diagrammatic representations of end views of the muzzle of the gun with "anti-whip" devices associated therewith;

Fig. 18 is a longitudinal sectional view of the gun barrel;

Fig. 19 is a vertical transverse sectional view looking aft through the trunnion supports for the gun;

Fig. 20 is a longitudinal vertical sectional view of the cradle for the gun adapted for mounting upon trunnions;

Fig. 21 is a view similar to Fig. 19 but looking forward;

Fig. 22 is a side elevational view of the gun mounted within its cradle;

Fig. 23 is an end view of the muzzle of the gun;

Fig. 24 is a sectional view of the cap for the muzzle of the gun;

Fig. 25 is a vertical sectional view of the muzzle end of the gun with a cap applied thereto;

Fig. 26 is a plan view of the breech end of the gun mounted in its cradle, the cradle being shown in section;

Fig. 26a is an end elevation of the hand wheel for closing the breech end of the gun;

Fig. 27 is an enlarged side elevational view of the breech end of the gun mounted in its cradle and showing the means for elevating the gun as well as the means for supplying pneumatic pressures to the gun recoil mechanism; and Fig. 28 is a rear elevation of the breech end of the gun particularly illustrating the counterbalance.

In Fig. 1 there is represented at 30 a 40,000 ton battleship firing two shells in succession in the conventional manner from a conventional gun supported always and fired under "droop" strain, at an enemy ship indicated at 31, the firing being at "fixed range" from data secured through the use of the best known naval range finder. Here, one shell is represented by dotted lines as having passed over and beyond the enemy ship in a characteristic 2,800 foot second trajectory, and the other shell is similarly represented as having fallen short and dived into the sea. With "fixed range" the conditions are best for target hits. The gun 32 is represented as carried in the usual manner high above the water line 33, and 34 represents the angle of departure of the shell from said gun. The gun 32 may be of 16 inch bore and 55 calibers long, which approaches, if not exceeds the limit for "anti-droop" performance over a desired period of life. The projectile being fired is of conventional length, weighing 2,100 pounds. With the best naval range-finders at only 5,000 yards, for example, the error in measurement is 30 yards or 90 feet, and the old proverb "a miss is as good as a mile" is perhaps permissible to quote in this important connection. With the conventional naval shell and the "angle of fall" as indicated at 35, the expensive shell dives and is lost. Modern automobile torpedoes have a range up to 15,000 yards and it may be assumed that the battleship 30 is firing on the battleship 31 within this range, and that the battleship 31 is carrying the boom 35 and the torpedo net 36. This net may or may not stop a modern torpedo, and a modern torpedo may or may not sink a battleship, depending upon the size of the ship, the number of water tight compartments, and the number of compartments flooded. A torpedo therefore with a 600 pound charge of tri-nitro-toluene may strike a capital ship and yet not damage her nor her crew seriously.

In Fig. 2 there is shown at 40 one design of one of my new submersible fighting ships, having the long and powerful gun 50. This vessel may have displacements of 2,800 and 4,800 tons respectively when on the surface and when submerged, as compared with a 40,000 ton battleship, and she may carry her longer and more powerful gun with an "anti-droop" support as provided by her deck recess for firing her gun at low angles (when the droop force is the greatest) by a pneumatic piston indicated at 37.

This new vessel is shown approaching the enemy ship 38, the gun 50 firing under the condition of changing range, from data supplied also by the best known naval range-finder. A changing range is the most difficult to measure, and yet I am indicating a direct hit through the use of the dotted line. I am showing an exceedingly low "angle of departure" of the shell at 39, and a corresponding small "angle of fall" at 41 and when using a longer shell, there will be a flatter trajectory by virtue of a 4,000 or a 5,000 foot second muzzle velocity, wherefore such longer shell will be deflected by the water of the sea to produce a sure penetration of the torpedo net 42 and a penetration of the armor of the ship 38. Such longer type of shell from an 18 inch gun may carry 1,000 pounds of tri-nitro-toluol, and instead of detonating outside of the ship's hull as the torpedo would, it will burst inside the ship with disastrous effects upon machinery, magazine and men.

Assuming the present range to be only 5,000 yards, the swiftest automobile torpedo at an assumed average speed of 30 knots an hour would require six minutes to hit. The shell from one of my super-guns such as 50 at 4,000 foot seconds, would require less than six seconds to hit. Obviously, a commander might maneuver his ship in the six minutes time interval and dodge the torpedo, but he could not dodge very well the much swifter moving "flat trajectory" shell.

At the angle of fire indicated at 43, one or more of my new vessels may lie fifty miles or more out at sea and, through radio advice, burst "aerial torpedoes" or 18 inch shells over a city under an air fleet attack. With my great shells (virtually aerial torpedoes) direct hits would not be necessary, even with the tremendous spread of the shell fragments, since the aerial concussion would wreck or stop airplane propellers and cause the pilots or passengers to suffer fatal concussion.

At the vertical angle of fire indicated at 44, my vessels could lie along side of a capital ship, for example, and take part in her defense against air craft attack.

In Fig. 3 I am representing what purports to be a completely fashioned and equipped submersible battle cruiser adapted for surface and submarine navigation. This vessel may carry a 16 or 18 inch super-gun and the hull of the ship may be of the order of 400 feet in length, and the ship may be capable of a surface speed of 18 or 20 knots, and a submerged speed of 8 or 10 knots. At 6 knots surface speed she may have a cruising radius of 10,000 miles or more, and navigate below the surface to a depth of 150 feet or more, and maintain her level through her fins at a speed of as low as 2 knots an hour.

The numeral 45 indicates a hinged bow sight, and 46 is an officers' observation "turret" with a telescope 47, enabling the gunner to look directly ahead at the enemy as well as at the graduations upon the segment 48 mounted upon the gun cradle 49 through which the gun 50 slides. The range finder is indicated at 51, the periscope at 52, and the telescopic mast for radio reception at 53, and a slab of light armor plate at 54 receives the blast of the gun when it is fired at low angles, such as the one shown and which is of the order of six or seven degrees. It will be evident from a study of this vessel's hull, that her stern end may lift, in diving, two or three degrees without coming out of the water, and this stern elevation may be subtracted from the illustrated six or seven degree "angle of departure" of a shell fired from the gun because of the concomitant depression of the prow of the vessel, a fact which is of great importance when substantially a point blank shot at a target becomes desirable. Hence, should this gun be fired at the time and/or position of diving, it would be possible to secure an angle of departure of the shell from the gun of the order of only three or four degrees. This submersible could therefore slip up close to a 40,000 ton battleship, fire practically point blank, and thereby hardly fail to strike a fatal blow. Being able to dive at once, she could soon elude counter attack. The gun cradle 49 is trunnioned at 55 to be statically balanced or substantially balanced about this point of support, and is rotated about such trunnions through the agency of a pair of toothed sectors, one on each side of the gun, the port one being shown at 56 and operated as by the electric motor and worm gear 57.

A cut away view of the open well-way is shown at 60, and this well-way is adapted to be opened and closed at its bottom by a pair of hinged auxiliary keel members, the port one of which is shown opened, or turned down into the sea, at 65. This open well-way is shown filled with water (its normal condition) and has disposed therein the breech end of the gun including the heavy, area-increasing counterbalance or weight 70 securely attached to the breech end of the gun. A portion of the superstructure 80 is shown cut away to show the accommodation of the upper portion of said counterbalance. The plurality of members indicated by the numeral 71 are special anti-depth-bomb diaphragm devices adapted to relieve the hull of the vessel of undue shock in case a depth bomb detonates within a certain zone. These devices comprise water tight compartments or chambers back of a water-excluding diaphragm adapted to be ruptured by a depth bomb detonation in lieu of damaging a plate or seam of the vessel's hull. Experiments made with models and powerful electric dentonators indicate that under certain circumstances and at certain distances such devices are safeguards to the plating of model hulls, and it is likely that intensive full scale experimental work may likewise prove these devices invaluable to a vessel such as mine. The vessel's diving and elevating rudders are indicated at 72, her steering rudder at 73, her port propeller at 74, and a possible torpedo tube at 75.

In Fig. 4, 76 represents a long recess for the gun in the deck of the vessel, with a sheet of armor plate 54 disposed in relation thereto to receive the blast of the gun at low elevations, said plate being slotted as indicated for the reception of the droop-proof carriage of the vessel's gun, and 65' represents the vessel's starboard hinged auxiliary keel member which, together with the vessel's port hinged auxiliary keel member 65, is shown in closed position or turned up into the normal plane of the ship's bottom. At 77 is indicated the length and position of the gun's water evacuating and capping system, and at 78 is indicated the length and position of the vessel's swabbing and loading system for her gun, both of which systems will be disclosed more fully hereinafter with reference to other figures of the drawings.

In Fig. 5 the water tight compartments or chambers are shown at 76 and 76', back of the water excluding diaphragms 71 and 71', and I desire to state that a sufficient plurality of these may be used, both in the vessel's hull and in her superstructure, to afford ample protection against the "water-hammer" shock of depth bombs at certain distances therefrom in the sea. A mathematical law of effective impact based upon relieving yield of structure is applicable here, and has gone hand in hand with my experiments so far conducted upon model vessels and their platings equipped with my depth bomb relief diaphragm chambers.

In this figure 77 and 77' represent the heavy plates comprising the fore-and-aft walls or sides of the well-way of my vessel, and 55 and 55' represent the positions of the trunnions of the gun cradle supported by said plates, and 78 and 78' represent the still heavier transversely disposed structural ends of the well-way attached to the side plates 77 and 77' to resist displacement by internal water pressure through exerting tension upon the said side plates. Locking members are indicated at 80 inserted into grooves of both the side plates and the end plates of the well-way 60 and it will therefore be seen that I provide approved construction against the end members of the well-way being displaced by internal hydrostatic pressure either when my vessel dives to approved ocean depths or when a part of the recoil of my vessel's gun is counteracted hydraulically by the water within this open well-way.

In addition to the tensional construction of the end members 78 and 78', I fashion the central longitudinally disposed members 81 and 82 to furnish compression resistance to the displacement of said end members, the longitudinal members 81 and 82 running forwardly and aft of the vessel respectively. Still further I provide the obliquely positioned thrust or compression members 83, 84, 85, 86, 87 and 88, which, through compression, convey thrust respectively to the plate members 90, 89, 93, 91, 92 and 94 riveted to the vessel's hull plating, which in turn convey the thrust to the solid water of the sea, whose resistance to the same is represented by the numerous small arrows.

The resistance to displacement of the large area side plates 77 and 77' of the well-way, is provided by special pressure resisting transversely disposed web frames or ribs represented by the numeral 95 which convey the pressure also to the vessel's hull plating and in turn to the solid water of the sea whose resistance likewise is represented by small arrows. A vessel constructed with the foregoing members connected and interconnected, will not only resist injury in diving, but also the recoil shock as produced by the gun.

In Fig. 6 is shown the design and construction of the pressure resisting web frames or ribs 95, consisting of heavy plates with apertures therein to permit the placement of fuel tanks, ballast tanks, machinery or gang-ways, and the large arrows shown in the water of the sea represent the counteracting pressure of the sea to the internal pressure of deep sea depths or gun recoil. The breech end of the gun is indicated at 96, with a front end view of the heavy, area increasing counterbalance 70 showing not only its long lower portion but the upper portion thereof including the auxiliary weight 79. The ends of the vessel's hinged auxiliary keel members 65 and 65' are shown opened or turned down into the sea, and they comprise the angle members 97, 97' which automatically form a common keel member when the well-way is closed through the swinging up of these keel members, hinged as at 98, by pressure downwardly upon the levers such as 99 by the connecting rods and pistons of the hydraulic cylinders such as 100 fed by the hydraulic main or conduit such as 101. The hinged auxiliary keel members, by virtue of their weight, open under the urge of gravity when the water pressure in the hydraulic cylinders is allowed to fall to sufficient extent, and are closed hydraulically by duly increasing the water pressure in said cylinders.

In Fig. 7 the closed position of these auxiliary keel members is shown as brought about by increasing the hydraulic pressure in the cylinders 100. These auxiliary keel members serve the vessel in quadruple manners as follows: When they are up or closed as shown in this figure, they form a keel by the bringing together of the members 97, 97' and also prevent eddy currents of the water of the sea from impeding the progress of the vessel. When these hinged members are down (as illustrated in Fig. 6) they tend to lower the center of gravity of the vessel as the gun is elevated, thereby eliminating some of the weight which otherwise would be necessary in the gun counterbalance 70; and lastly but by no means least of this quadruple function, they furnish powerful anti-rolling keels. Hence, when the vessel is submerged, or awash, with her hull below the roots of the waves in the solid water of the sea, there is provided the steadiest gun platform of anything afloat, since the pair of auxiliary anti-roll keels would counteract the action of the wind and sea upon the hull of the vessel, her insignificant gun muzzle area, periscope, and a portion of her small conning tower.

Figs. 8 and 9 are bottom plan views of the hull of the vessel in the region of the well-way 60 and show respectively the keel members 65, 65' in open and closed positions. From the description given hereinabove, it is believed that no further remarks are necessary with reference thereto.

In Fig. 10 the vessel is indicated as upon an even keel, with the gun 50 horizontally stowed in its water-evacuating and capping position, and with its important anti-droop supports at the muzzle end as at 102 as well as under the barrel as at 203.

When it is realized that this may be an 18 inch gun, 60 calibers long, which is the equivalent of 90 feet, it will be recognized and conceded that there is no present battleship mount which could handle such a gun. The droop, the whip, the length of travel of its recoil would make the use of such size gun practically impossible in known battleship construction. It will likewise be freely conceded by gun experts that a shell from such a gun when adequately mounted and correctly handled, could pierce the armor of any ship afloat with ease, and prove at once more destructive to the ship than any torpedo known. However, by my invention and as the description develops hereinafter, it will readily be seen that a gun of this great size not only can be mounted on my ship but handled and fired with relative ease and efficient results.

The cradle 49 and the end members 107 and 108 thereof, support four pneumatic cylinders and one hydraulic cylinder, two of the port side pneumatic cylinders being shown at 109 and 110, and the single central hydraulic cylinder being shown at 111. The four pneumatic cylinders are adapted to operate for forcibly sliding the gun forward or backward respectively through this cradle by the application of vacuum or of positive pressure respectively to the pistons in said cylinders. The duct 112 supplies the vacuum or the air pressure as desired through the hollow trunnion 55, and the vacuum or the air pressure depends upon the position of the two-way valve 113.

In one position of this valve the duct 112 receives compressed air from the electrically operated pump cylinders 114, 114 whose pistons are operated through the agency of connecting rods, cranks and crank shaft in the casing 115. The end of the crank shaft is shown at 116 carrying the large gear wheel 117, driven by the pinion 118 on the shaft 119 of the electric motor 120. In the other position of said valve, the duct 112 receives vacuum pressure from the duct 128 connected to the vacuum pump chamber 130 (shown only in Fig. 12). A pressure guage 129 is shown connected to the duct 112, while 131 indicates a storage battery adapted through the wiring shown in dotted lines to operate the electric motor 120.

I have not attempted, in the interest of clarity of illustration, to show the starting, stopping, and reversing switch for the motor 57 deriving its power from said storage battery for operating the cradle turning gear segment 56, nor have I shown the necessary third wire and rheostat therefor since the same will be readily understood. The storage battery 131 receives its charging energy through the conductors such as 132 from the electrical generator 133, driven by the Diesel engine 134 receiving its operating fuel from the oil tank 135 (see Fig. 12).

The piston rods 225 and 226 of the port pneumatic cylinders are attached securely to the massive area-increasing counterbalance member 70 through the threaded massive nuts 138 and 139, and the piston rod 227 of the central hydraulic cylinder 111 is similarly attached securely to said member 70 as by the massive nut 140. The important large area, disk hand wheel, for screwing in the breech block, is illustrated at 150, which breech block also screws through the hinged member 151 facilitating its removal from the threads in the rear end of the bore of the powder chamber of the gun (said threads shown only in Fig. 18 at 152).

The massive hydraulic cylinder 153, through its centrally bored out piston 154 and hollow piston rod 155, supports and moves to the left and to the right the massive bulkhead closing member 156, with its flange 157 and its cylindrical extension member 158. This cylindrical extension member 158 is adapted to pass through an opening therefor in the rear wall 78 of the well-way 60 and is fashioned to receive and cover liquid-tight the entire breech end opening and closing mechanism of the gun, including the great solid hand wheel 150, when the breech of the gun is in the closed position and with a substantially water-tight fit. Through the hollow piston rod 155 slides the small piston rod 159 which, at one end, is adapted to carry a ramming device indicated at 160 which, however, may be easily replaced by a swabbing device when required. The other end of the piston rod 159 carries the piston 161 having sliding fit in the long cylinder 78 (see Fig. 12). The vertical hydraulic cylinder 162 is provided with suitable piston to lift the ammunition cradle 163 and its contained ammunition 164 (shell and/or powder charges) to bring said ammunition in coaxial registry with the ramming piston rod 159 as well as the gun, when the gun is in the loading position. A second storage battery 165 is electrically connected with the previously described battery 131 as well as connected to a source of charging power, and 166 indicates a buoyant conning tower.

With particular reference to Figures 6, 7 and 10 it will be seen that the counterbalance 70 is of a width to give relatively narrow clearance with respect to the fore-and-aft walls of the well-way considering the forces and areas involved. Further, the depth of this member 70 is made very great to provide an enormous rear surface area operative against the sea water in the well-way during gun recoil.

Consequently, there are three factors entering into the action of this member 70, (1) the resistance offered due to the pressure built up on the rear face of such member during recoil, (2) the additional resistance caused by a suction action in the region of the front face of such member, and (3) a "dash-pot" action which involves the aforementioned clearance of the fore-and-aft walls of the well-way. This second factor of suction action may be augmented and/or made more positive by creating a recess of relatively large area on the lower front face of said member, either by countersinking a portion of such face, or by establishing a skirt or outwardly extending rib or flange around a large area of such face, as indicated by the dotted lines 250 in Fig. 28. This "dash-pot" action is quantitively dependent upon the amount of clearance provided; with a small clearance, this "dash-pot" action will be very great and, hence, there is opportunity to secure as much or as little hydraulic braking action as may be desired. In this "dash-pot" action, the hydrostatic pressure of the sea water in the well-way is communicated through the stout pressure-resisting web frames or ribs 95 of the vessel to the solid water of the sea beyond the outer plating. Hence, the great force of gun recoil is not "focussed" upon the trunnions and/or their supports, but is hydrostatically distributed throughout a comparatively immense area to the solid water of the sea. It will be appreciated at once that the forces at work normally tending to "break the back" of a light structure, such as a submersible vessel, are tremendously reduced according to this invention and make practical the use of a very heavy and super-powerful gun.

Referring to Fig. 11, 167 is a sleeve or cylindrical member adapted to be driven over the muzzle end of the gun through the agency of the central bored-out member 167' by means of the hollow piston rod 169 actuated by the bored out hydraulic piston 170 in the hydraulic cylinder 171. The bored out capping member 172 moves forward and backward along with the sleeve member 167, and when a cap member 168 is elevated to a position in line with the bore of the gun, said cap may be driven into said bore with a water tight fit by said capping member. Before the gun is capped, however, the long hollow piston rod 173 is driven into the gun barrel from muzzle to breech by means of the combination valve-piston 174 sliding in the long cylinder 175 provided with the open end vent 176 and with the lateral opening 177. By connecting the lateral opening 177 with a powerful vacuum pump 180 (see Fig. 12) the valve-piston 174 causes its piston rod 173 to enter the gun barrel and to travel therethrough until the advancing end of said rod reaches the breech block, at which time the valve opening 178 in the piston 174 comes into registry with the lateral opening 177 whereupon, the system still being under powerful suction, the water in the barrel of the gun 50 is evacuated, as well as any water which may be in the sleeve member 167.

With air pressure now applied to the opening 177 from the source of compressed air 130 (see Fig. 12) the long hollow water-evacuating piston rod 173 is completely withdrawn from the gun. The hydraulic cylinder 179 is then actuated to draw back the slide-valve 182, and then the telescopic piston 183 in the hydraulic cylinder 184 is actuated to raise the elevator member 185 provided for raising and correctly positioning the cap 168 for application to the muzzle of the gun.

186 is a cap-receiving chamber adapted to be closed by the hinged door 187, and the side duct 188 is connected to a vacuum system for removing any water which may have accumulated in said chamber.

I have not shown the necessary connecting pipes and valves, in the interest of simplicity, nor have I shown the necessary hydraulic pumps, but I have shown the source of available power in Fig. 12 comprising the Diesel engine 134 driven by fuel from tank 135, and it is to be understood that this power source and/or the storage batteries will operate all auxiliary devices. The sleeve member 167 is notched out (not shown) to accommodate the compressed air cap-removing pipe 190 to be described more fully hereinafter.

In Fig. 12 the breech end of the gun is shown in the swabbing out and loading position, with the breech and hand wheel 150 unscrewed and turned up out of the way. This heavy breech mechanism is, of course, raised by an auxiliary power device (not shown) after unscrewing. It is believed that the power plant is sufficiently clearly illustrated so as to require but little amplifying description. It should be pointed out that 191 represents a connecting and disconnecting clutch mechanism between the Diesel engine 134 and the electric generator-motor 133 driven thereby, to provide for the operation of the vessel, when submerged, by electric power from the storage batteries, and 192 represents by-pass valve devices for rendering idle the combination air compressor and/or vacuum pump 195, and 196 represents an electric motor whose pinion 197 operates the large rudder actuating gear 198. Similar electric motors, pinions and gears may likewise operate the elevating and diving rudders 72 shown only in dotted lines, and likewise ballast tanks, pumps and valves not shown may be similarly operated.

The two-way valve 199 is for the application of vacuum or air pressure at will to the long cylinder 78 of the swabbing system. I may elect to fashion the piston rod 159 of a hollow construction, similar to that of the water evacuating piston rod 173 shown in Fig. 11, not only for the removal of any vestige of water which may remain in the powder chamber of the gun, but to draw off obnoxious gases from the bore of the gun after a shot has been fired. It is well known that such gases are more or less of a menace to the gun crew and I claim the incorporation of such a gas removing system here, although for clearness of illustration I am not attempting to show the details in the drawing.

Referring to Fig. 13 the gun is shown full length in the loading position with a projectile placed and centered ready to be driven into the gun after the gun has been evacuated of water and capped. Connection of the hollow trunnion 55 with the powerful vacuum system of the vessel has drawn the gun to its extreme rearmost position relative its cradle, such position being greater by several feet than its recoil position when the cylinders are charged with compressed air through the same hollow trunnion system. Here in dotted lines is indicated the hydraulic system 101 for opening and closing the auxiliary keel member such as 65.

The vital importance of the auxiliary keel members, apart from the lowering of the center of gravity, and in producing a keel member when raised or closed and in supplying anti-roll members when open or lowered, is emphasized here by the lowermost portion 200 of the forwardly facing surface of the well-way 60.

If the lower part of this open well-way were not closed as by the keel members 65, power retarding eddy currents would be set up in the region of this surface portion 200 when the vessel advanced through the water, especially in the case of surface vessels, light cruisers and destroyers for example, and in the case of submersibles when operating at comparatively high speed upon the surface. At low speed submerged, the eddy current retardation is far less important.

By referring to Fig. 14 it will be seen that the gun barrel is clearly shown in four positions namely, (1) stowed upon its anti-droop supports, (2) at a low angle of elevation, capped and ready for a practically point blank shot, (3) at the extreme recoil position after firing such shot, and (4) in the direct vertical position.

In its anti-droop stowage position, support is not only given at 201 just where most required, namely, at the extreme muzzle end but additional support is given at a position further along under the barrel as at 202 by the end of the massive piston 203 of the pneumatic or hydraulic cylinder 204. The arrow 205 indicates that the position of this piston and cylinder may be moved along nearer to the muzzle end of the gun in case the hydraulic anti-whip fin 206 is not employed, which fin necessitates a deep but narrow groove-way 207. In anti-whip study, the position of greatest movement may be observed and largely counteracted by moving such a pneumatic or hydraulic cylinder 204 along, back and forth in a preliminary gun study, observing the pneumatic or hydraulic guage reading 208 or its equivalent, as a measure of vibratory stress. The anti-whip fin 206 diminishes lateral whip, and the heavy piston 203 arrests vertical whip, especially if the cylinder 204 is hydraulic.

In Figs. 15, 16 and 17 are illustrated devices to overcome whip as well as to support the barrel against droop. The normal characteristic rotary vibratory whip of the muzzle end of the gun is shown in dotted lines in Figs. 15 and 16 as also the steadying effect which I provide comprising the hydraulic fin 206 and/or the hydraulic piston 203, the latter being my preferred design.

Hinged standards are illustrated in Fig. 17 at 209 and 209' adapted to steady the muzzle end of the gun against lateral whip at the moment of firing and, with the additional arrest provided against vertical whip by the hydraulic piston 203, the gun muzzle may be held very steady, removing most if not all of the molecular strain from the remote lengths of the gun barrel. It is my contention that no other gun mount in use contributes such support to the welfare, life and sustained accuracy of such a long gun as here contemplated.

In Fig. 18 210 represents the powder chamber of the gun, and 152 the threads cut therein for the reception of the breech block. These threads may be of the interrupted kind or, for greater strength, of the continuous kind, as shown. At the muzzle end of the gun, surrounding the bore 211, is a narrow and shallow annular groove 212, turned out of the flared end of the gun, and entered from the upper side of the muzzle by the small bore lateral hole 213. This small bore hole is for the reception of one end of a compressed air duct 190 to be described later.

Fig. 19 is a part sectional view through the gun cradle, illustrating the piping system adapted to supply vacuum and compressed air, respectively, to the pneumatic cylinders and compressed air to the pneumatic gun-cap removing system.

Through the hollow gun trunnion 55' compressed air and vacuum are alternately supplied to the pneumatic cylinders 109' and 110' through the ducts 215 and 216, respectively, and thence to the opposite pneumatic cylinders 109 and 110 as by the interconnecting ducts shown in dotted lines respectively at 217 and 218.

From the hollow trunnion 55, compressed air is supplied through the pipe 219 to the tube 220 which is, as seen in Fig. 20, supplied with a stuffing box 221 at one end thereof. The heavy trunnions 55 and 55' are not only bored out part-way through, as illustrated, but they are turned down to lesser diameter and shouldered as shown at 222 and 223 in order that they may be faced into the holes 224 and 225 of the gun cradle casting.

In Fig. 20 the port side pneumatic pistons and piston rods are shown in section at 226 and 226' and the piston rod of the central hydraulic cylinder is shown in elevation at 227. The piston head 228 of this hydraulic cylinder 111 has by-pass openings through it as shown, properly proportioned in relation to the volume of oil contained in the cylinder to produce the proper auxiliary arrest to the pneumatic cylinders both in recoil of the gun and in "return to battery."

In Fig. 21 the electric wires 230 and 231 for firing the gun are shown passing through the insulating bushings in the trunnions 55' and 55 and entering the insulated tube members 232 and 233. Insulation is here represented by the heavier black lines.

Referring to Figs. 22 to 25 the port sliding electrical connection rod is shown at 235, it being understood that there is a similar starboard sliding electrical connection rod in order to complete an electrical circuit from the insulated wires leading into the trunnions, through insulated bushings in the massive gun counterbalance member 70, to the breech block for firing the gun.

The pneumatic gun-cap removing tube or duct 190 is shown with one of its ends passing through the stuffing-box 221, with an air-tight sliding fit, into the cylinder 220 carried by the gun cradle and fashioned to receive compressed air through the hollow trunnion 55 and its piping system as previously described. The other end of said duct communicates tightly with the small bore 213 leading laterally into the annular groove 212 in the muzzle end of the barrel, whereby compressed air is furnished to said groove and behind the flange of the cap 168 to blow said cap away from the muzzle when the gun is ready to be fired.

With this system the gun cap may be driven into the gun with a sure and water-tight fit, which is a matter of the utmost importance, with equally sure, safe ways and means of removing said cap. To furnish conclusive knowledge to the gunner that the cap is either off or on with a tight fit, he need only to consult a pressure guage in the compressed air pipe line. With a thousand pounds pressure to the square inch, for example, in this gun-cap removing system, at the moment the cap is blown off, the fact may be noted by the sudden fall in reading of the pressure guage in the air line. Again, by maintaining a comparatively small air pressure in the system, no water can enter the gun even if the cap is not perfectly water tight, because the groove-way and escaping air would force the water away.

In Figs. 26 and 26a it is thought that no parts need further discussion except the great hand wheel 150, which is of solid metal and of a diameter substantially equal to the outside diameter of the breech end of the gun, wherefore a relatively large area is presented to the water of the sea in the well-way 60 upon gun recoil. A possible electric connection for firing the gun is shown at 300.

Referring to Figs. 27 and 28, there is shown on larger scale the details of construction illustrated in Fig. 10, but it is desired to particularly point out the mechanism by which additional pressure is supplied to the four interconnected pneumatic cylinders for actuating the gun in its cradle. In the duct leading from the air pump cylinders 114 to the two-way valve 113, is mounted a relief valve 127 having the lever 126 associated therewith and adapted to increase the resistance of said valve when the free end of said lever is operated downwardly as seen in this figure.

For accomplishing this downward movement, there is provided a pivoted arm 121 having pivotal relation with one end of the bar 122 whose other end is pivoted as at 123 to the large gear segment 56 for turning the gun cradle. Said arm 121 has an angular extension 124 the free end of which is connected to the end of the lever 126 as by a heavy duty spring 125.

Thus it will be understood that, as the gun is elevated, there is a tendency for rearward slide thereof through the cradle under the urge of gravity because of the great weight of the gun and/or its counterbalance 70 and/or the contained ammunition, all of which progressively increases the resistance to the pneumatic pressure normally supplied to the four cylinders carried by the cradle. Hence, just prior to gun elevation, the valve 113 is turned to disconnect the duct 112 from the duct 128, and to connect the duct 112 to the auxiliary air pumps 114 in order to supply the necessary increased pneumatic pressure to said four cylinders and thus overcome the tendency of the gun to gravity-actuated sliding movement in its cradle.

As the gun elevates, the segment 56 rotates, and in this rotation the bar 122 turns the arm 121 and its extension 124 to increase the tension of the heavy duty spring 125 which in turn applies additional resistance to the relief valve 127 thus permitting the full increased pressure developed by the air pumps 114 to pass directly to said four pneumatic cylinders. As the arm 121 is thus turned, its extension may be made to pass successively over contact studs of a rheostat 120' for controlling the speed and power of the electric motor 120, whereby such speed and power is increased during said oscillation with resultant increase of the pressure developed by the pumps 114 actuated by said motor.

Obviously, when the gun is lowered said arm 121 is turned in the reverse direction which causes a reverse movement of its extension 124 resulting in a lessening of the speed and power of said motor. After the gun has been completely lowered, then the two-way valve 113 is turned to disconnect the duct 112 from the air pumps 114 and to connect the duct 112 with the duct 128 so that vacuum may be applied to said cylinders to cause rearward movement of the gun through its cradle to swabbing and reloading position.

Having illustrated and described what I believe to be the salient parts and combinations of parts fundamental in securing the various objects of this invention, I will now describe the operation of one of my new ship and gun combinations.

To load, sight and then fire this gun (which may be of any bore from 6 inch to an 18 inch, for example, and 60 calibers long, or longer let us say) with only its capped muzzle end out of the water at elevations such as for extremely low angle fire, or for distant shelling, or for vertical fire for certain aeroplane shelling, let us consider a complete cycle of the mechanical and electrical performance.

Starting with the gun elevated, uncapped, and after a shot has been fired, the gun is lowered by means of its twin gear segments such as 56 actuated by the twin electric motors and worm gears such as 57, one on each side of the cradle 49. The gun may be quickly lowered (and elevated) by this double motor system without great strain upon motors or gears, since the gun is substantially statically balanced about its trunnions such as 55 by virtue of the counterbalance 70. Thus, the gun is quickly lowered and stowed in the deck recess 76, with full anti-droop barrel support by virtue of the muzzle support 201 and/or the boss 102, as well as by the hydraulic piston barrel support shown in several of the views at 203.

The gun barrel and powder chamber probably will be partially or completely filled with water due to the fact that the uncapped gun muzzle, in descending, may have shipped some of the water of the sea, but any such shipped water will quench any possible glowing fabric or carbon from the powder bags and/or the ammunition used for the shot just made. Such glowing organic matter has caused many a frightful accident to gun crew and turret equipment in the past, and still continues to be the source of fear, nervousness and disaster in the conventional scheme now in existence for re-loading guns at sea.

The sleeve member 167 of the gun evacuating and capping system as illustrated in Fig. 11 is forced over the muzzle of the gun, and the bore is evacuated of water through the agency of the long hollow piston rod 173 and the vacuum system associated therewith. Instead of removing the water by vacuum, it will be evident that such removal may be accomplished by compressed air liberated in great volume and under high pressure in the powder chamber at the breech end of the gun by this system if desired. Having evacuated the water from the bore, the gun is then capped with a water-tight stopper such as 168 applied under hydraulic pressure. This cap is of special construction and the independent compressed air system provided for its removal before firing, has outstanding new features as will be appreciated as the description proceeds. The hollow sleeve is then withdrawn from the muzzle of the capped gun and if the vessel is submerged the hydraulic cylinder 179 is operated to close the slide-valve 182 to prevent entrance of sea-water to the duct 186 as well as to the lower parts of the system.

A powerful vacuum is then established behind the four piston heads in the four pneumatic cylinders of the gun cradle, to slide the barrel rearwardly and thus bring its breech end with a water-tight fit into the great hollow sleeve member 158 of the large bulkhead-closing member 157, as indicated in Fig. 10. Further movement of the barrel to its extreme rearmost position brings the breech into water-tight fit with the opening in the bulkhead of the ammunition room of the vessel as shown in Fig. 13.

The breech block is then unscrewed by the gunners, by means of the large disk design of hand wheel 150, and turned up out of the way by means of a proper mechanical hoist (not shown) and secured, and then the powder chamber and bore is quickly swabbed of any possible remaining water or moisture in the gun, by means of a swab carried by the piston rod 159 actuated by the aft or rear pneumatic piston system illustrated in Fig. 12. This rear system may be used as illustrated, but obviously it could be fashioned with a hollow piston somewhat similar to that illustrated in the bow or fore water-evacuating and capping system, whereby vacuum or compressed air could be supplied at will from the equipment shown.

The gun is then loaded by driving in the elevated projectile, as illustrated in Fig. 13, by means of a rammer (replacing the swab) actuated by said piston rod 159, and likewise the several bags of the powder charge are elevated and driven home after which the ammunition elevator 163 is lowered and the breech block turned down and screwed in or closed. The breech block may or may not have interrupted threads, but has the conventional small central hole drilled through it to the powder chamber for the reception of the fuse tube and of course there is the proper corresponding small hole through the center of the hand wheel. Electrical connections are made through suitable switches not shown, but a conventional diagrammatic illustration of an electrical battery for firing the charge is shown at 300 in Fig. 26a, it being understood that such battery is not placed at the zone indicated but at a proper location in the electric circuit for remote control from the officer's turret.

With the gun loaded and the breech closed, pneumatic pressure is now applied behind the four piston heads of the four pneumatic cylinders of the cradle, which forces the barrel forward to "battery" position (illustrated in Fig. 10) smoothly and without shock, due not only to the control action of the central hydraulic cylinder 111, but to the water of the sea, acting upon the large and heavy area-increasing counterbalance weight 70.

The pair of worm-geared electric motors, deriving steady power from the storage battery, are made to act through proper switches and rheostats to turn the gear segments such as 56 and so quickly raise the gun barrel to its desired angle of fire because, as previously pointed out, the gun is substantially statically balanced about its trunnions. Since, with this balance, there is no heavy muzzle preponderance, I am enabled to handle a great gun more quickly and with less strain upon gears and other parts than is possible with conventional guns on conventional battleships.

For elevating the gun, greater air pressure is required behind the four pistons of the four pneumatic cylinders of the cradle, to prevent the gun from sliding back, due to the action of gravity upon the gun barrel, breech end, and charge of ammunition. To this end I have particularly illustrated in Fig. 27 a means for automatically increasing this air pressure as by the electric operated pumps indicated at 114. Coincident with the raising of the long gun barrel is the lowering of the heavy area-increasing counterbalance 70 and, in addition, the automatic lowering of the auxiliary keel members such as 65. Through proper design, weight, and construction, the vessel according to this invention may not become top heavy as the long barrel of the gun elevates but, on the contrary, either becomes more stable, or else remains the same due to said keel members. In other words, the construction may be adjusted so as to insure the same approved center of gravity, and period of roll of a vessel equipped with one of my cooperative guns, whether the gun is stowed horizontally, is elevated to the vertical, or to any angle therebetween.

The angle of fire, especially for a great gun upon a large submersible, may be easily and accurately read with high instrumental precision upon the broad periphery of the great graduated quadrant shown in many of the illustrations at 48. I have designed a special two-way sight auxiliary telescope system shown diagrammatically only in Fig. 10. The officers and gunners are placed, it will be observed, directly but safely over the center axis of the gun, a position for extreme accuracy for a successful shot. There is, in addition to this efficient location for best marksmanship, no fear or nervousness upon firing the gun, because its superior, hydraulically re-inforced breech mechanism, to begin with, is deep in the solid water of the sea below, and any remotely possible breech failure would take place without harm or injury to gun crew or vessel. Moreover, and this is also an important factor in my new system, the psychology of this outstanding safety to life and limb of this design and construction will contribute in the equipment and in the marksmanship.

The angle of elevation of the gun, as determined by radio or scout plane advice is read in connection with range tables worked out for the gun in the degree, minute and second divisions marked as at 500 upon the side of the large gun elevating quadrant 56 through the agency of a vertical pointer 600 (see Figs. 10 and 27).

Having secured a range, and just before the gun is fired, the muzzle cap is blown off into the sea through the agency of a special and independent compressed air system including the duct 190 (see Figs. 22 to 25). Officers in the conning tower or turrent may not only see the cap blown off, but the fact is unfailingly indicated by the sudden fall of the reading of a pressure guage in the compressed air pipe line. One or more pressure guages may be connected to a suitable branch line, as well as to the main line and carried to any zone or zones of observation desired. A compressed air force of several hundred pounds to the square inch may be suddenly released in the annular grooveway 212 directly under the flange of the gun cap 168 at any moment. Moreover, one or more vacuum guages and pressure-resisting water guages may also be connected to this gun uncapping system and, through the agency of a two-way valve, the system may be connected alternately to the compressed air and vacuum pumps of the vessel at will. Immediately after capping, the system may be connected to the vacuum pumps, and the vacuum established will not only contribute to the seating of the already forced-in cap but, in addition, promptly remove any water from the muzzle end should, by the remotest chance, there be a leak between cap and gun muzzzle. Since water must enter the groove under the cap before it can enter the gun muzzle, it would be promptly drawn away by the powerful vacuum pumps of the engine room and be shown up in a glass guage tube.

With the firing of the powder charge my gun, in recoiling at low angles, is supported against both droop and whip and at the same time transmits its initial and swiftest backward movement, through sliding of the barrel in its cradle, to the solid water of the sea. The swifter the movement of a water-submerged and water-backed body, the greater the hydraulic resistance. I have provided here for an unusually long recoil, let us say ten or twelve feet for a 16 inch gun. As the gun barrel slides with diminishing speed with consequent diminish of the hydraulic resistance, the compressed air in the four pneumatic cylinders becomes more and more compressed, and thereby increases the resistance to further slide. At the maximum desirable pressure, I may elect to insert such a relief valve as shown at 121 in Fig. 27 and rely upon the design and construction of the piston in the hydraulic cylinder 111 of the gun cradle.

I have fundamental factors derived from the recoil of 16 inch guns upon different designs of gun mounts, including 16 inch guns upon railway carriages. Through knowledge of the weights of the railway carriages, the number of feet they are rolled back down the track, etc., I am enabled to derive formulas of a very concise and practical character. Thus it will be seen that one of my super-guns in recoiling, transmits its backward thrust at diminishing speed to correctly and scientifically supplied arrests. The setback force is not only applied to the yielding fluids in all five of its gun cradle cylinders, pneumatic and hydraulic, to the deep and heavy side plates of the now open well-way, but to the mass of the large, surface-increasing counterbalance 70 in the solid water of the well-way.

By referring to Figs. 14 and 27, it will be noted that the lower end of this large and massive steel casting extends down deep into the open wellway and it is tapered off from a plane surface as indicated by the dotted lines shown in both figures. Although the bearing length of the barrel of my gun is long in the bore of the cradle through which it slides, and the diameter and strength of the four pneumatic pistons and the auxiliary fifth hydraulic piston are stout, there is nevertheless a turning effect or force to reckon with in the direction of the little arrows bb, bb, and b'b', b'b' at the moments of set back, due to the fact that the lower limb of my counterbalance is longer than the upper limb. Therefore there will be a differential action, not serious because of the construction but nevertheless for perfect performance, to be reckoned with.

To counteract this turning force I have elected to taper the lower end and rear surface of this counterbalance and therefore the action of the solid water before and around it, in the backward movement of the recoil, tends not only to arrest the backward travel of the counterbalance but to lift it. In lifting it, it must swing around the gun trunnions in the opposite direction of the counter turning force. The weight of the metal which I have removed by tapering this lower end, I have elected to place in an inertia mass 79 at the upper end of the counterbalance, and therefore the arrow aa indicates correctly the inertia of this mass as a correcting factor.

Let us assume, for example, that this gun shown in Fig. 14 is of 16 inch bore and at least 60 calibers long, and because of this length of barrel and my heavy counterbalance, is greatly subnormal, and that I provide for a 10 foot recoil. At present, guns of 16 inch bore, of shorter caliber and devoid of my sub-normal recoil characteristics, are arrested in recoil on battleships with a recoil slide of four or five feet, for lack of room in turrets, etc. This short-stop recoil puts an enormous strain upon gun trunnions and ship, even with the 2,800 foot-second muzzle velocities, and it would be out of the question to replace such guns in the conventional turrets for a 4,000 or a 5,000 second velocity of shell, entirely apart from the droop carriage of such a powerful gun, and its unchecked tendency to "whip."

It may be argued that the life of a gun with a 4,000 or a 5,000 foot second velocity of its projectile is much shorter than for a gun having a shell velocity of 2,800 or 3,000 foot seconds, due to erosion of the rifling by the higher powder temperatures and pressures. This is not strictly a fact with my gun and ship. In the first place, it is not the gun that wears out, if properly supported at all times, but the lining tube, and such tube may be replaced when required.

Again, I need not always use my gun at the highest muzzle velocities of the projectile but, through reduced powder charges, I may secure the same 2,800 foot second trajectory as at present in practice for limited naval use. But when I do elect to use the higher shell velocities, I claim that new factors are with me for making surer hits, since I need not fire so many wild and wasteful shots, nor do I need to know the exact range in some cases, as hereinbefore stated.

It is obvious that those skilled in the several arts and sciences involved in this invention and its applications, may vary the parts, combinations of parts, ways, means and methods of construction and operation, without departing from the spirit of this invention, and therefore it is not desired to be limited by the foregoing description and diagrammatic illustrations, except as may be called for in the claims.

What is claimed is:

1. A high power long range gun adapted to be fired with its breech end in the sea, comprising a barrel and a recoil mechanism therefor, a suspension device for said recoil mechanism, and a counterbalance carried by said barrel adjacent to the breech end of the barrel and secured to a portion of the recoil mechanism, said counterbalance fashioned to present a recoil area of resistance to the water of the sea of at least twice the area represented by the entire breech end of the barrel.

2. A high power long range gun adapted to be fired with its breech end in the sea, comprising a barrel and a recoil mechanism therefor, a suspension device for said recoil mechanism, and a counterbalance carried by said barrel adjacent to the breech end of the barrel and secured to a portion of the recoil mechanism, said counterbalance extending laterally beyond the confines of said barrel to present a recoil area of resistance to the water of the sea of at least twice the area represented by the entire breech end of the barrel.

3. A high power long range gun comprising a recoiling barrel and a suspension member therefor adapted to swing the breech end of the barrel vertically in a body of water, the volume of the body of water being sufficient to envelop the breech end of the barrel, a counterbalance carried by said barrel adjacent to the breech end thereof and having a depending surface disposed substantially perpendicularly to the axis of the barrel, said surface presenting a recoil area of resistance to the body of water which is at least twice the area represented by the entire breech end of the barrel, and means to fire the gun with its breech end submerged.

4. A high power long range gun comprising a recoiling barrel and a suspension member therefor adapted to swing the breech end of the barrel vertically in a body of water, the volume of the body of water being sufficient to envelop the breech end of the barrel, a counterbalance carried by said barrel adjacent to the breech end thereof and having a surface extending laterally beyond the confines of said barrel, said surface disposed substantially perpendicularly to the axis of the barrel and presenting a recoil area of resistance to the body of water which is at least twice the area represented by the entire breech end of the barrel, and means to fire the gun with its breech end submerged.

5. A gun for a submersible vessel, said gun mounted in the water of the sea and comprising a barrel, a recoil mechanism for the barrel, said mechanism including a depending counterbalance for the barrel, the counterbalance having a surface disposed substantially perpendicularly to the axis of the barrel, said counterbalance through such surface acting against the water of the sea as a shock absorber upon firing of the gun, and means for loading, elevating and firing said gun.

6. A gun for a submersible vessel, said gun mounted in the water of the sea and comprising a barrel, a recoil mechanism for the barrel, and a member adjacent to the breech end of the barrel and secured to said barrel and to the recoil mechanism, said member having a surface disposed at right angles to the axis of said barrel, said surface providing an area for hydraulic resistance to the water of the sea, upon firing, greater than the breech end area of the barrel.

7. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance extending downwardly in the well-way and having an effective surface area at least twice that of the transverse area of the breech end of the barrel, said effective surface area operative against the water in the well-way to counteract recoil when the gun is fired.

8. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance having portions disposed above and below the breech end of the barrel, said counterbalance movable downwardly in the well-way when the barrel muzzle is elevated for firing, said counterbalance having an effective surface area at least twice that of the transverse area of the breech end of the barrel, said effective surface area operative against the water in the well-way to counteract recoil when the gun is fired.

9. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance having portions disposed above and below the breech end of the barrel, the lower portion of greater extent than the upper portion, said counterbalance movable downwardly in the well-way when the barrel muzzle is elevated for firing, said counterbalance having an effective surface area at least twice that of the transverse area of the breech end of the barrel, said effective surface area operative against the water in the well-way to counteract recoil when the gun is fired.

10. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance having portions disposed above and below the breech end of the barrel, the lower portion of greater extent than the upper portion, the lower portion having a rear surface the plane of which is angularly disposed to the plane of the rear surface of the upper portion, said counterbalance movable downwardly in the well-way when the barrel muzzle is elevated for firing, said counterbalance having an effective surface area at least twice that of the transverse area of the the breech end of the barrel, said effective surface area operative against the water in the well-way to counteract recoil when the gun is fired.

11. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance having portions disposed above and below the breech end of the barrel, the lower portion of greater extent than the upper portion, the lower portion having a thickness decreasing in a downward direction, said counterbalance movable downwardly in the well-way when the barrel muzzle is elevated for firing, said counterbalance having an effective surface area at least twice that of the transverse area of the breech end of the barrel, said effective surface area operative against the water in the well-way to counteract recoil when the gun is fired.

12. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance having portions disposed above and below the breech end of the barrel, the lower portion of greater extent than the upper portion, the lower portion having a thickness decreasing in a downward direction, the upper portion having added thereto a mass of metal substantially equal in weight to the weight of the metal lost by the decrease in the thickness of the lower portion, said counterbalance movable downwardly in the well-way when the barrel muzzle is elevated for firing, said counterbalance having an effective surface area at least twice that of the transverse area of the breech end of the barrel, said effective surface area operative against the water in the well-way to counteract recoil when the gun is fired.

13. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance having portions disposed above and below the breech end of the barrel, the lower portion having a thickness decreasing in a downward direction, the upper portion having added thereto a mass of metal substantially equal in weight to the weight of the metal lost by the decrease in the thickness of the lower portion, said counterbalance movable downwardly in the well-way when the barrel muzzle is elevated for firing, said counterbalance having an effective surface area at least twice that of the transverse area of the breech end of the barrel, said effective surface area operative against the water in the well-way to counteract recoil when the gun is fired.

14. A gun carried by a vessel having an open well-way therein filled with water of the sea, said gun having a recoiling barrel the breech end of which is in the water of the well-way, said barrel having a substantially rectangular counterbalance secured thereto adjacent the breech end thereof, said counterbalance extending downwardly in the well-way and having an effective substantially flat rear surface area at least twice that of the transverse area of the breech end of the barrel, said effective surface area operative against the water in the well-way to counteract recoil when the gun is fired.

15. A gun carried by a vessel having an open well-way therein filled with water of the sea, said gun having a recoiling barrel the breech end of which is in the water of the well-way, said barrel having a substantially rectangular counterbalance secured thereto adjacent the breech end thereof, the width of said counterbalance being such as to provide a relatively close clearance with the walls of said well-way, said counterbalance extending downwardly in the well-way and having an effective surface area at least twice that of the transverse area of the breech end of the barrel, said effective surface area operative against the water in the well-way to counteract recoil when the gun is fired.

16. A gun carried by a vessel having an open well-way therein filled with water of the sea, said gun having a recoiling barrel the breech end of which is in the water of the well-way, said barrel having a substantially rectangular counterbalance secured thereto adjacent the breech end thereof, said counterbalance movable downwardly through the water in the well-way with a dash-pot action by virtue of the counterbalance having a width such as to provide a relatively close clearance with the walls of said well-way, said counterbalance having an effective substantially flat rear surface area at least twice that of the transverse area of the breech end of the barrel, said effective surface area operative against the water in the well-way to counteract recoil when the gun is fired.

17. A gun carried by a vessel having an open well-way therein filled with water of the sea, said gun having a recoiling barrel the breech end of which is in the water of the well-way, said barrel having a counterbalance secured thereto adjacent the breech end thereof, said counterbalance immersed in the water in said well-way and fashioned to provide a static balance for the barrel, said counterbalance having an effective substantially flat rear surface area at least twice that of the transverse area of the breech end of the barrel, said effective surface area operative against the water in the well-way to counteract recoil when the gun is fired.

18. In combination, a vessel comprising a hull and a well-way therein, said well-way adapted to receive therein the water of the sea, a gun carried by the vessel, said gun having a barrel with its breech end in said well-way and covered by the sea water therein, said well-way having a wall disposed opposite the breech end of the barrel toward and from which the breech end of the barrel is movable incident to loading the gun, gun-loading means carried by said hull and normally separated from the barrel by said wall of the well-way, said wall having an aperture therein normally closed by one portion of said gun-loading means, and means to move said barrel to bring its breech end into position against said wall to close the aperture therein and thereby to release the said one portion of the gun-loading means for subsequent operation in loading the gun.

19. In combination, a vessel comprising a hull and a well-way therein, said well-way adapted to receive therein the water of the sea, a gun carried by the vessel, said gun having a barrel with its breech end in said well-way and covered by the sea water therein, said well-way having a wall disposed opposite the breech end of the barrel toward and from which the breech end of the barrel is movable incident to loading the gun, gun-loading means carried by said hull and normally separated from the barrel by said wall of the well-way, said wall having an aperture therein normally closed by a portion of said gun-loading means, and means to progressively move said barrel rearwardly to bring a part of its breech end first into water-sealed relation with said portion of the gun-loading means and then upon further rearward movement to displace said portion from said aperture with coincident water-sealing of said aperture by another part of the breech end of the barrel, thereby releasing said portion for subsequent operation in loading the gun.

20. In combination, a vessel comprising a hull and a well-way therein, said well-way adapted to receive therein the water of the sea, a gun carried by the vessel and provided with a barrel which when lowered after firing has its muzzle covered by the water in the well-way, said well-way having a wall disposed in front of the muzzle of the stowed barrel and provided with an aperture, and means carried by said hull to evacuate water from and to place a cap over the muzzle of the gun barrel, said means having a portion fitting said aperture.

21. A gun for a vessel having an open well-way therein filled with water of the sea, said gun provided with a barrel slidable in a recoil mount pivotally supported by the vessel, the breech end of said barrel disposed in the water of the well-way, and a counterbalance carried by said barrel adjacent to the breech end thereof, said counterbalance having dash-pot action with the walls of and the water in the well-way upon recoil of the barrel at firing.

22. In combination, a vessel comprising a hull and a well-way therein, a gun provided with a barrel carried by the vessel and adapted for movement in the well-way, said well-way having a wall disposed opposite the breech end of the barrel toward and from which the breech end of the barrel is movable incident to loading the gun, gun-loading means carried by said hull and normally separated from the barrel by said wall of the well-way, said wall having an aperture therein normally closed by one portion of said gun-loading means, and means to move said barrel to bring its breech end into position against said wall to close the aperture therein and thereby to release the said one portion of the gun-loading means for subsequent operation in loading the gun.

23. In combination, a vessel comprising a hull and a well-way therein, a gun carried by the vessel and provided with a barrel adapted for movement in the well-way to bring the muzzle of the barrel into said well-way when lowered after firing, said well-way having a wall disposed in front of the muzzle of the stowed barrel and provided with an aperture, and means carried by said hull to evacuate water from and to place a cap over the muzzle of the gun barrel, said means having a portion fitting said aperture.

24. A gun for a submersible vessel having an open well-way therein filled with water of the sea, said gun adapted to be fired at any angle of elevation, said gun provided with a barrel slidable in a recoil mount pivotally supported by the vessel, the breech end of said barrel disposed in the water of the well-way, and a counterbalance for said barrel secured to a portion of such recoil mount, adjacent to the breech end of the barrel, said counterbalance having dash-pot action with the walls of and the water in the well-way thereby constituting a hydraulic piston operable against the water of the sea upon recoil of the barrel at firing.

25. A gun for a vessel having a deck adapted to be submerged below the surface of the sea, said gun having a barrel mounted on the vessel below the surface of such deck, and means carried by said barrel wholly adjacent the muzzle end thereof and coacting with the water of the sea to counteract whip of the barrel when the gun is fired at low angles of elevation.

26. A gun for a vessel having a deck adapted to be submerged below the surface of the sea, said gun having a barrel mounted on the vessel below the surface of such deck, and means disposed solely within the vertical plane of the barrel and coacting with the water of the sea to counteract whip and droop of the barrel when the gun is fired at low angles of elevation.

27. A gun for a vessel having a deck adapted to be submerged below the surface of the sea, said gun having a barrel mounted on the vessel below the surface of such deck, and means to prevent droop of the barrel when the barrel is stowed and fired at low angles of elevation, said means comprising a piston carried by the vessel and vertically operable through such deck.

28. A gun for a vessel having a deck adapted to be submerged below the surface of the sea, said gun having a barrel mounted on the vessel below the surface of such deck, and fluid operated means to prevent droop of the barrel when the barrel is stowed and fired at low angles of elevation, said means comprising an axially movable member carried by the vessel and operable through such deck, the end of said member freely engaging the under surface of the gun barrel.

29. A gun for a vessel having a deck adapted to be submerged below the surface of the sea, said gun having a barrel mounted on the vessel below the surface of such deck, and means to counteract whip of the barrel when the gun is fired at low angles of elevation, as well as to prevent droop of the barrel when the barrel is stowed and fired at such angles of elevation, said means comprising a vertically movable member carried by the vessel and operable through such deck, the end of said member comprising a saddle freely receiving the gun barrel therein.

30. A gun for a vessel having an open well-way therein filled with water of the sea, said gun having a recoiling barrel the breech end of which extends into said well-way, a breech mechanism for the barrel comprising a hinged breech block adapted to close the breech end of the barrel, a member for closing the breech block said member fashioned to present an area of surface to the water in the well-way which is greater than the area of the surface of said breech block, the surface of said member imparting resistance to the recoil force operating against the water in the well-way when the gun is fired.

31. A gun for a vessel having an open well-way therein filled with water of the sea, said gun having a barrel slidable in a mount pivotally supported by the vessel, the breech end of said barrel disposed over the well-way, and a counterbalance for the barrel, said counterbalance having a limb which extends downwardly beyond the confines of the barrel into the well-way and fashioned to impart a resistance to the recoil force operating against the water of the sea in the well-way when the gun is fired.

NEVIL MONROE HOPKINS.